J. W. MYERS.
CURRENT MOTOR.
APPLICATION FILED MAR. 11, 1909.
949,747.
Patented Feb. 15, 1910.
10 SHEETS—SHEET 1.
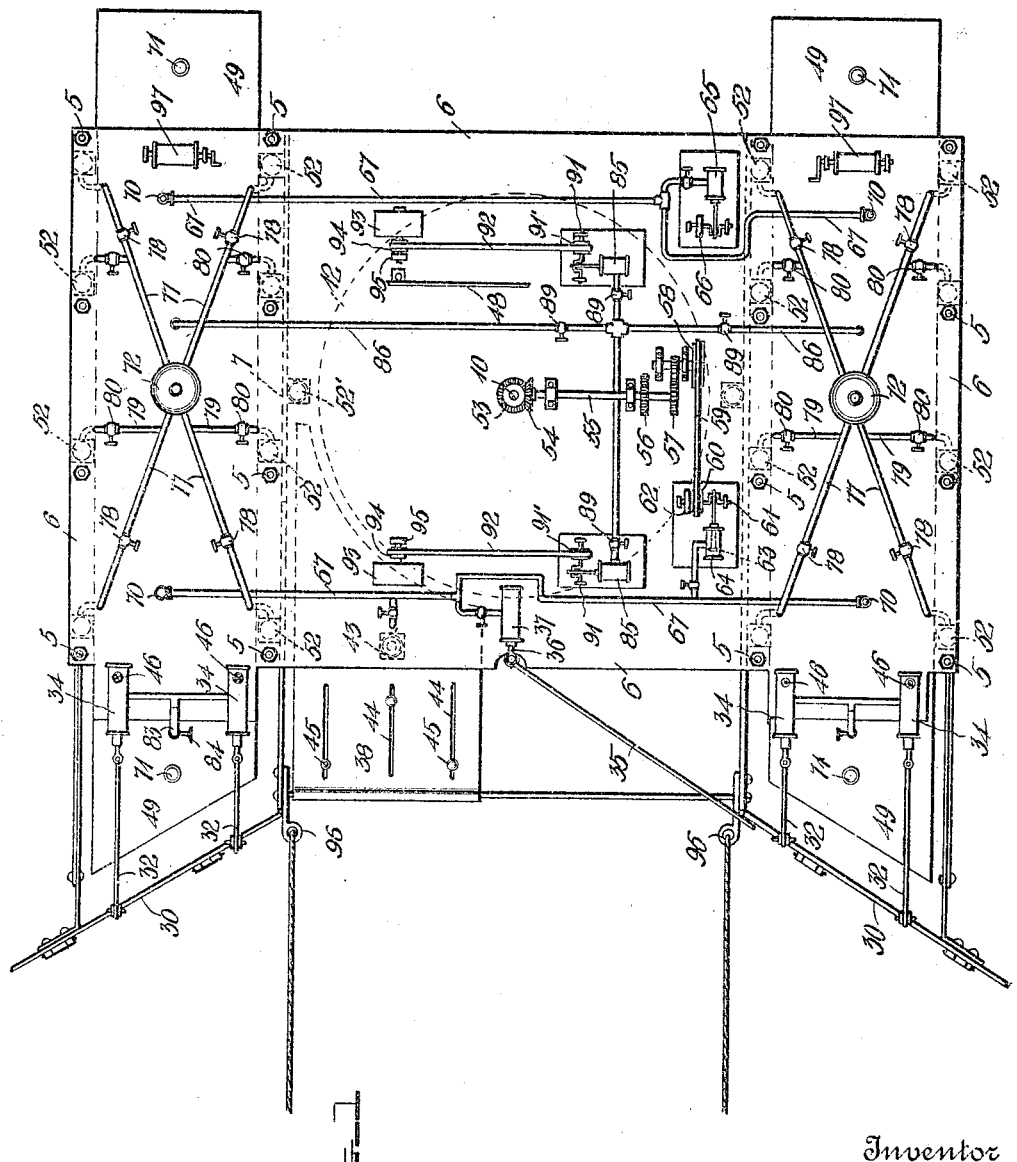
Witnesses
C. H. Griesbauer.
Inventor
James W. Myers
by H. B. Willson & Co
Attorneys

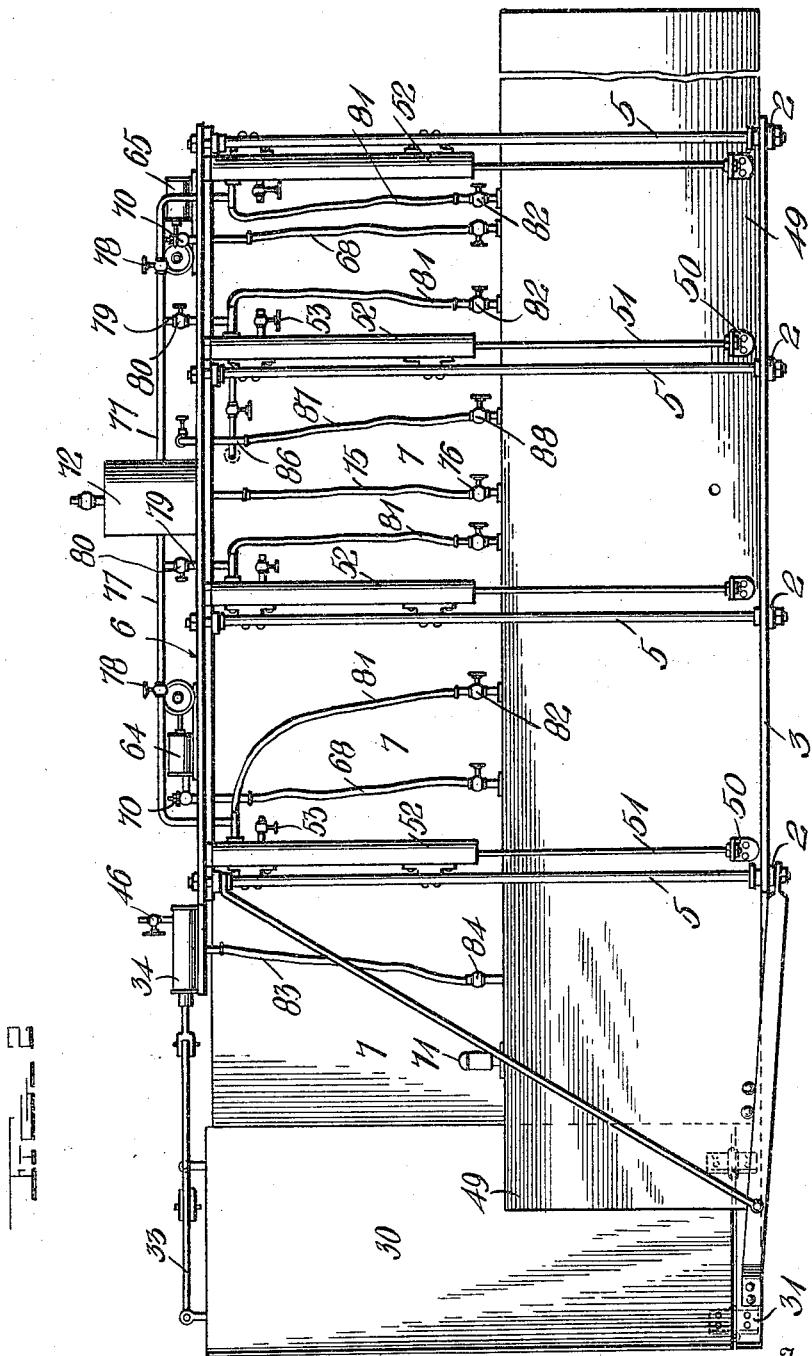

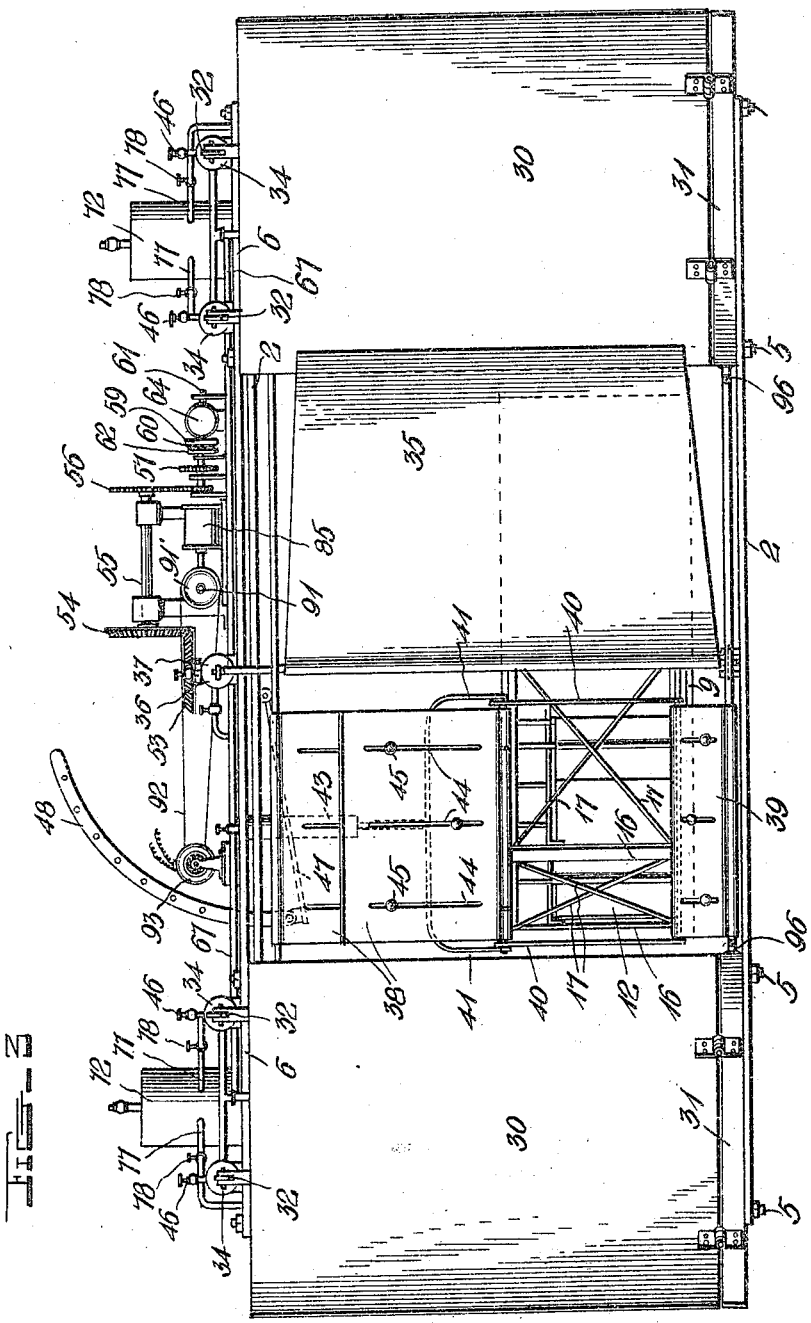

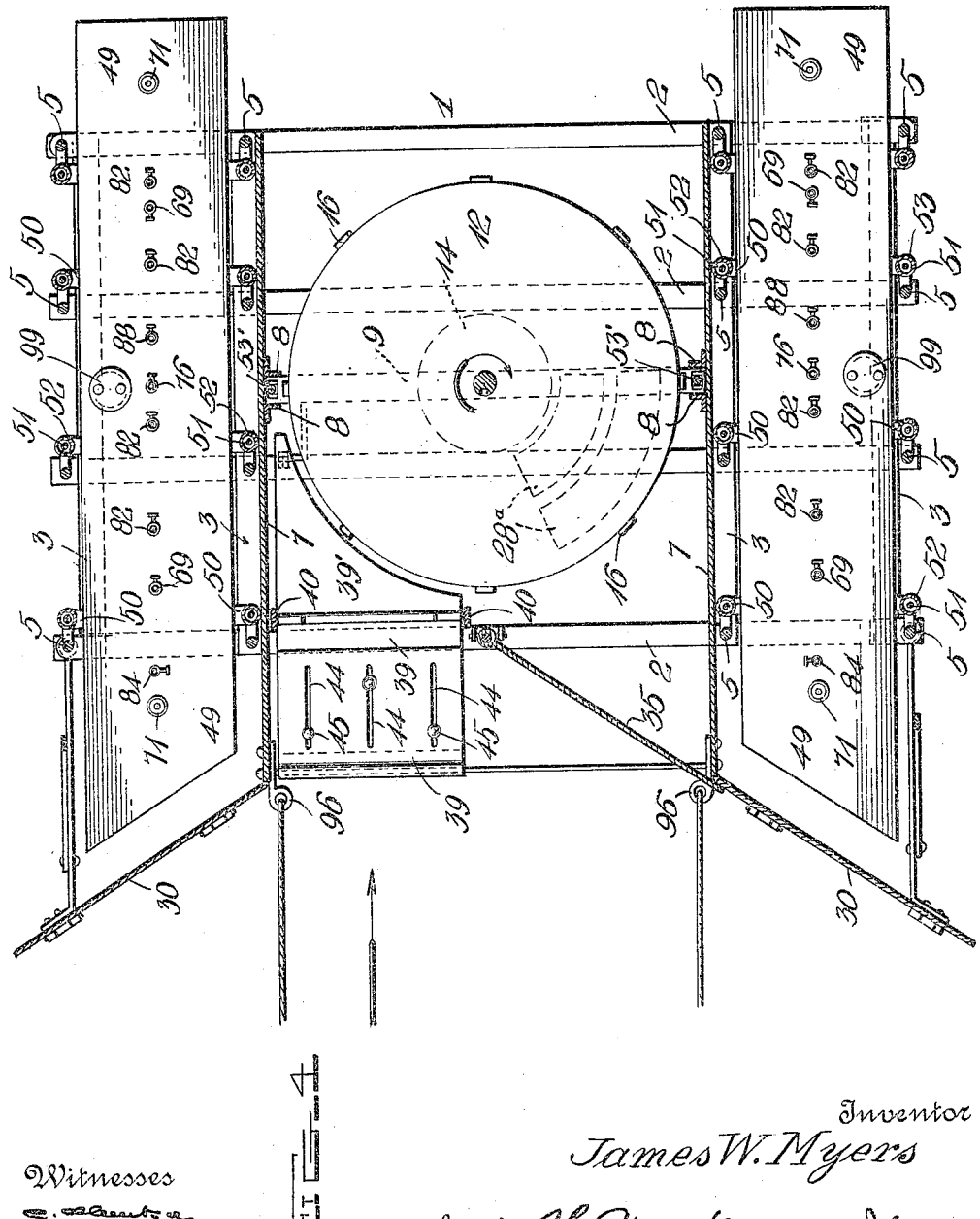

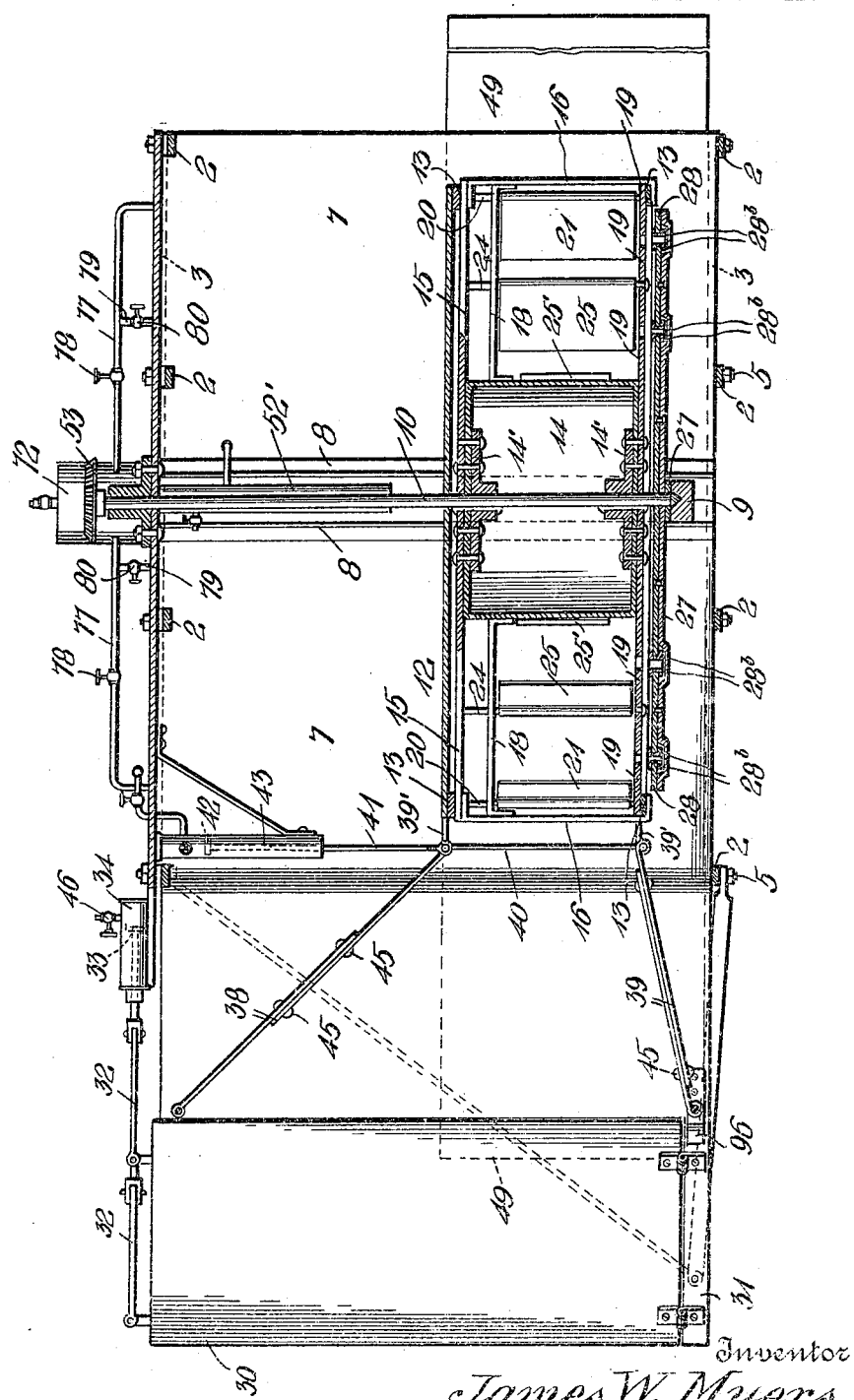

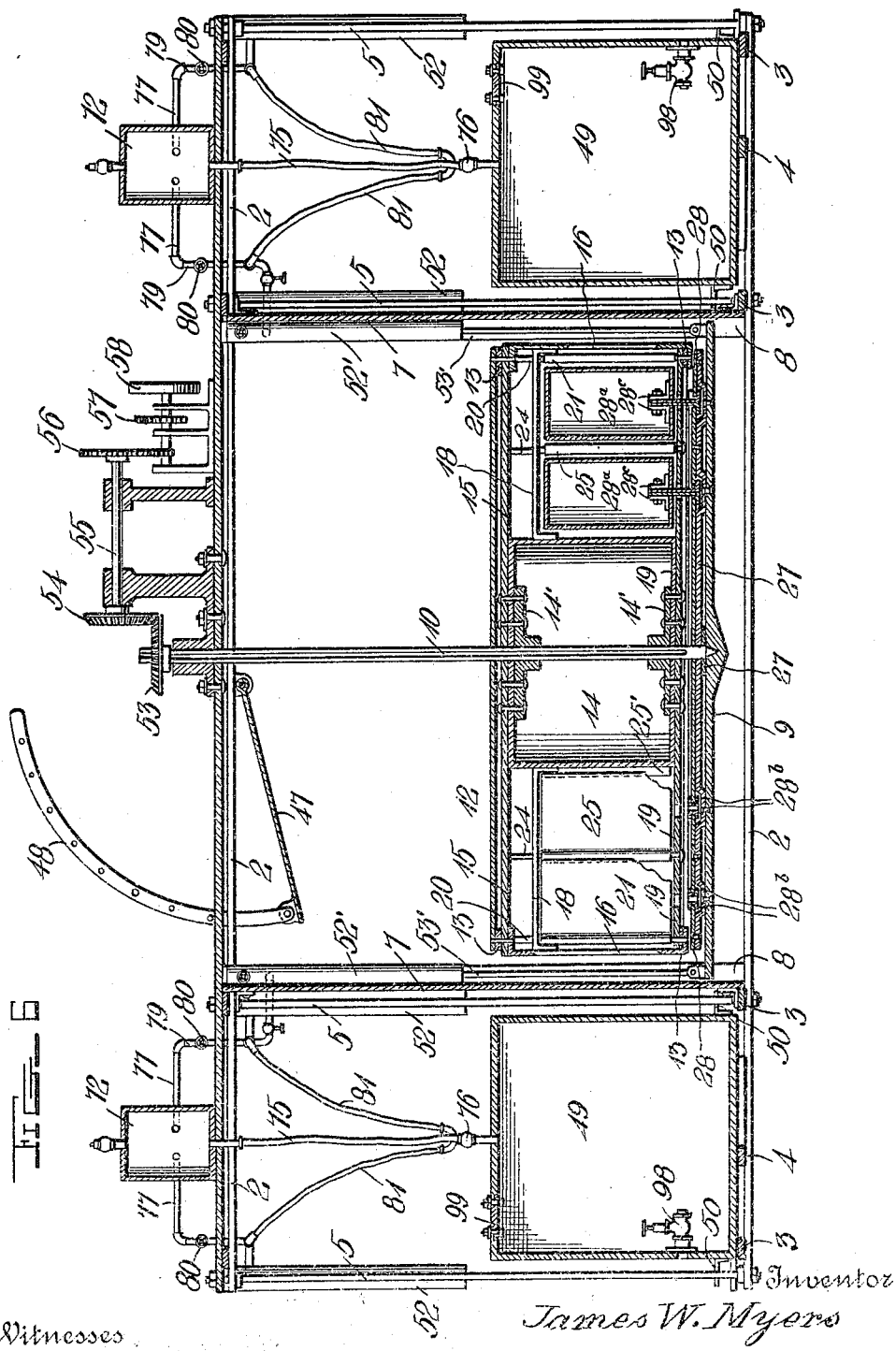

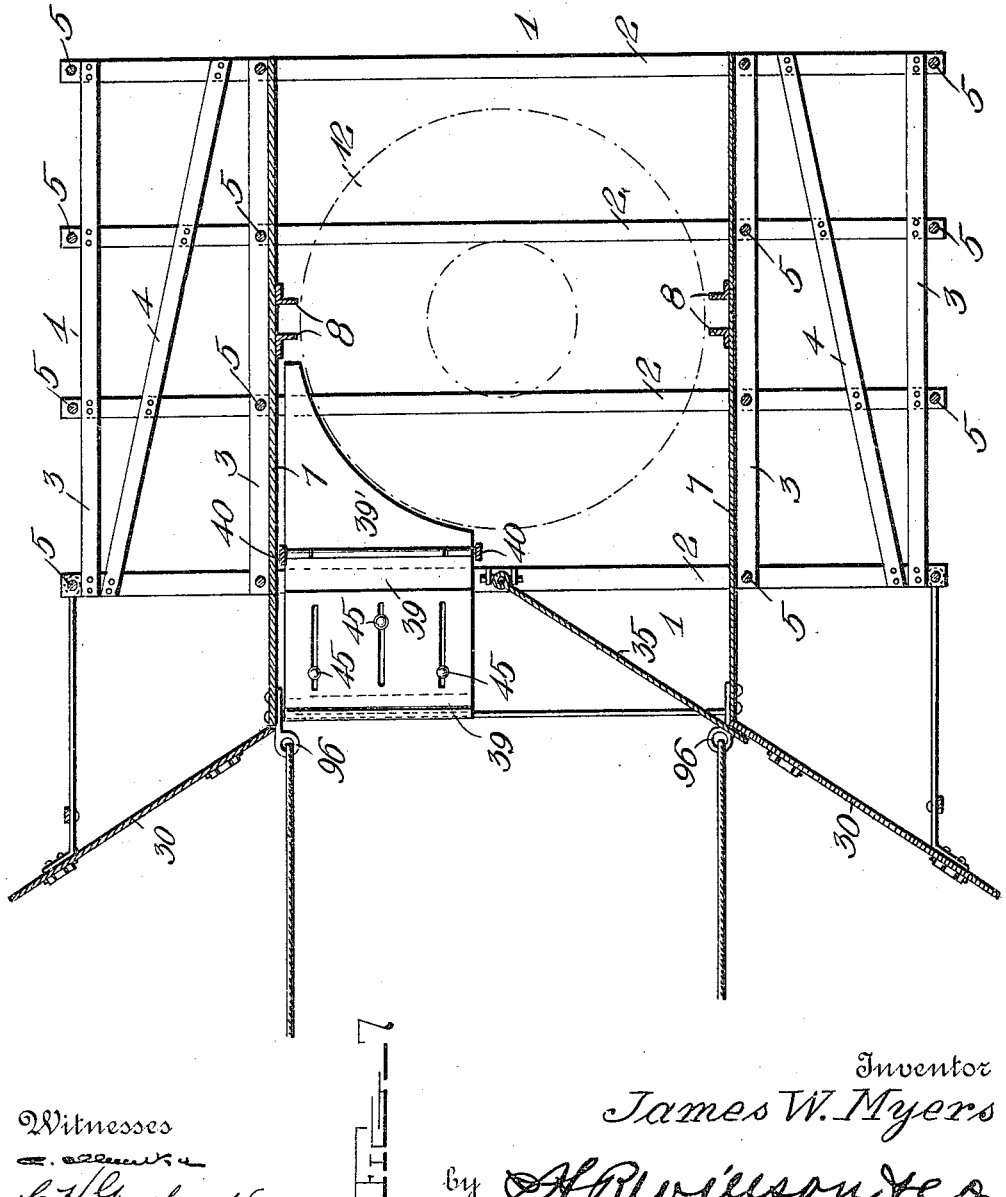

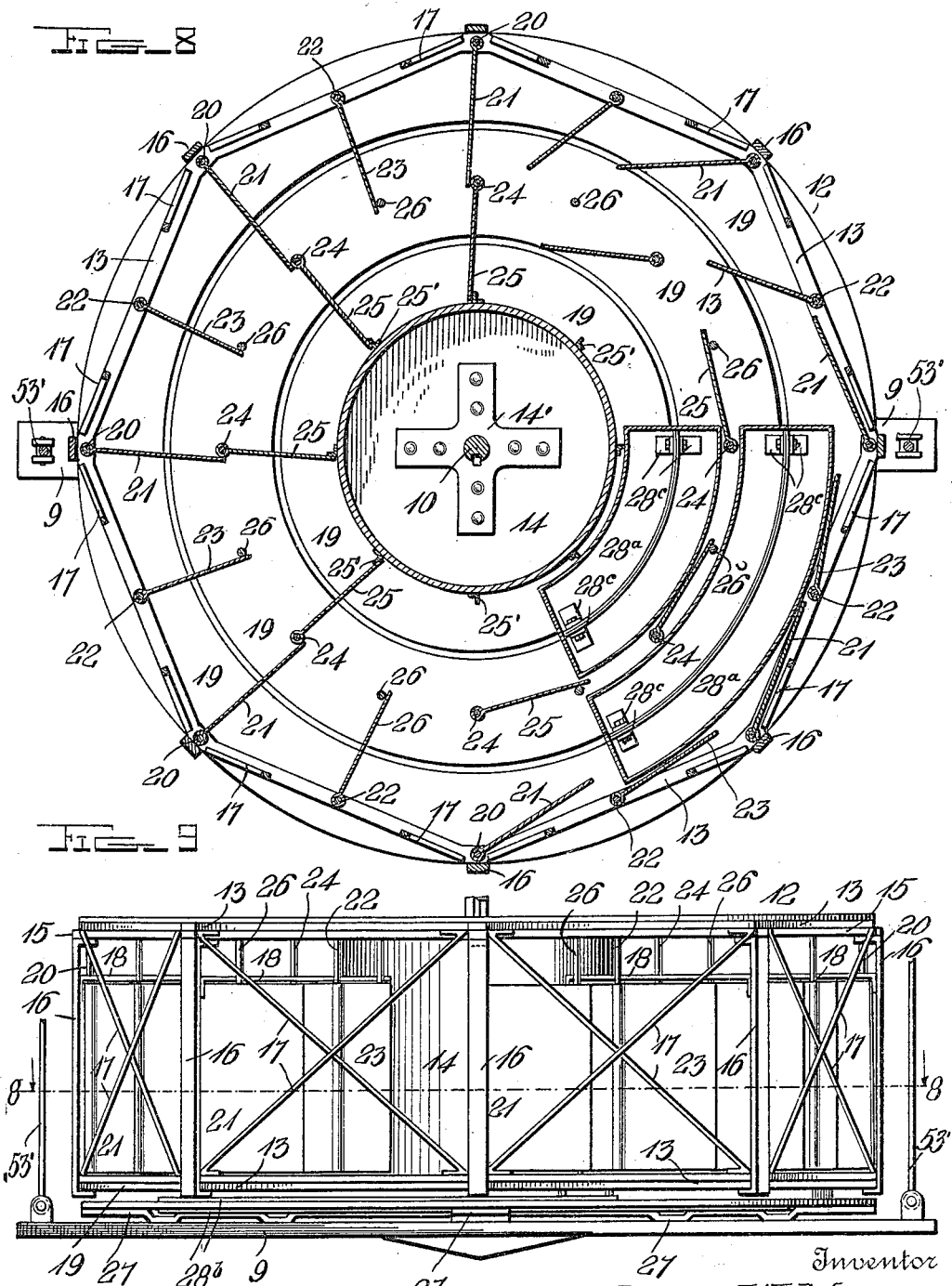

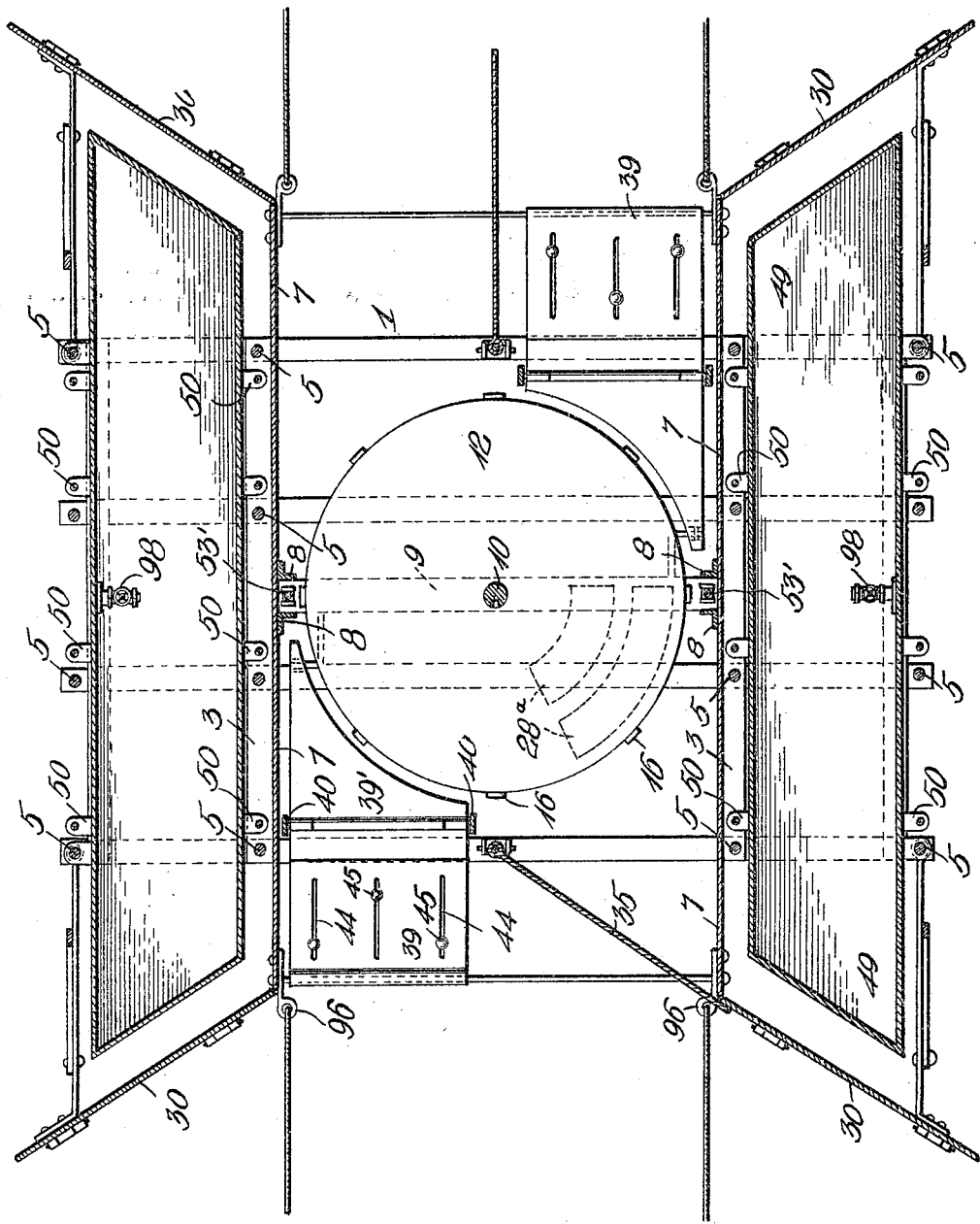

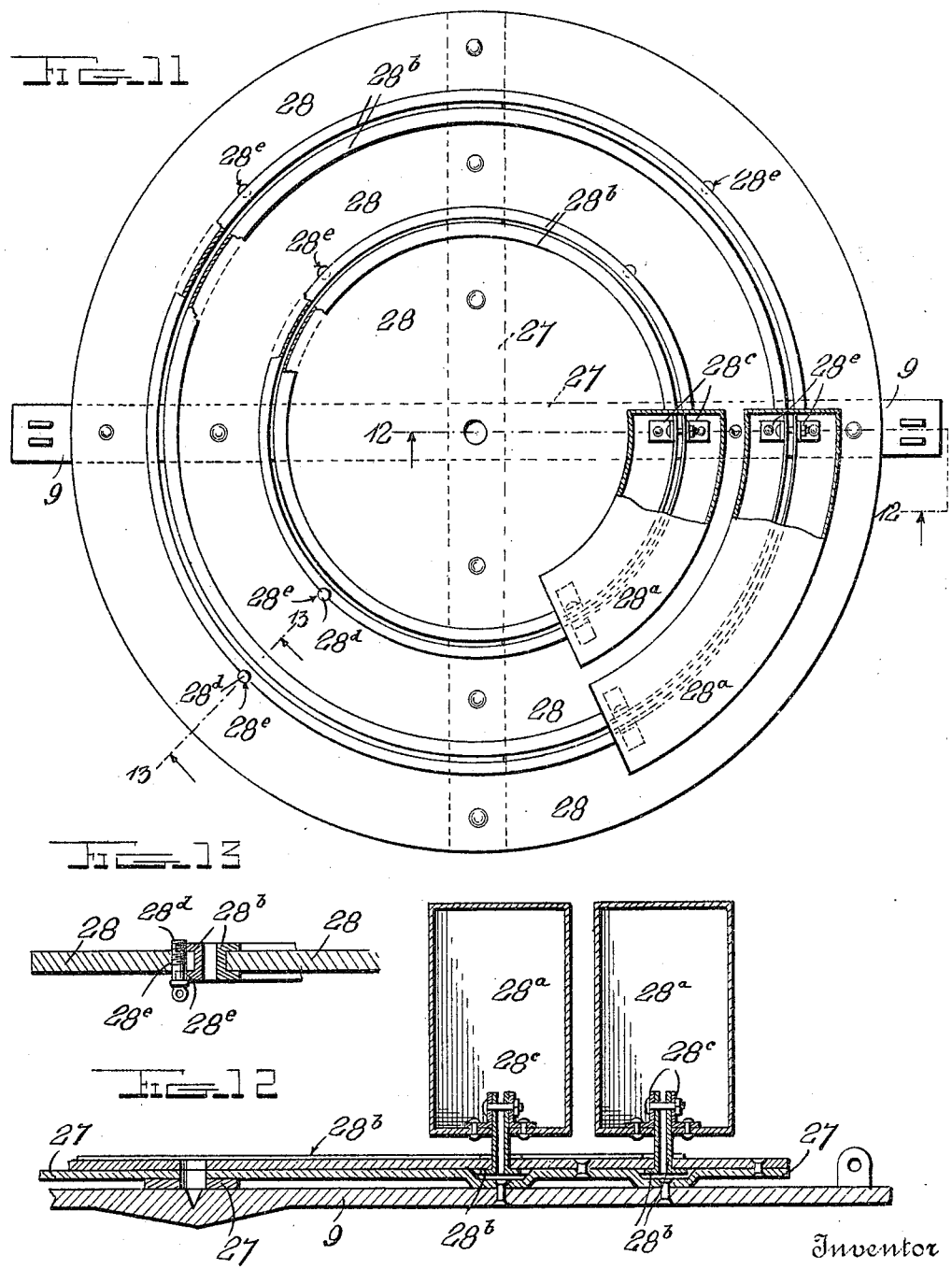

UNITED STATES PATENT OFFICE.

JAMES W. MYERS, OF ROBINSON, ILLINOIS, ASSIGNOR TO MYERS MOTOR CO., A CORPORATION OF ILLINOIS.

CURRENT-MOTOR.

949,747.  Specification of Letters Patent.  Patented Feb. 15, 1910.

Application filed March 11, 1909. Serial No. 482,844.

*To all whom it may concern:*

Be it known that I, JAMES W. MYERS, a citizen of the United States, residing at Robinson, in the county of Crawford and State of Illinois, have invented certain new and useful Improvements in Current-Motors; and I do declare the following to be a full, clear, and exact description of the invention, such as will enable others skilled in the art to which it appertains to make and use the same.

This invention relates to improvements in current motors.

The object of the invention is to provide a motor of this character adapted to be supported on floats, whereby the same will rise and fall with the tide, means being provided whereby the water wheel in said motor may be adjusted, thereby raising and lowering the same in the water to a greater or less degree, or raising the same entirely out of the water.

Another object is to provide a device of this character having means whereby the current of water may be directed from all sides onto the working side of the wheel thus increasing the power and speed of the latter.

A further object is to provide means whereby the movement of the water wheel may be employed to compress air into the floats which serve as air accumulators or reservoirs and to provide means whereby the air thus accumulated may be employed for raising and lowering the wheel, and also the frame work of the motor.

Still another object is to provide means whereby the compressed air accumulated in the floats may be employed for running dynamos which are preferably arranged on the motor, the electricity generated from said dynamos being employed for any desired purposes.

With these and other objects in view, the invention consists of certain novel features of construction, combination and arrangement of parts as will be more fully described and particularly pointed out in the appended claims.

In the accompanying drawings, Figure 1 is a top plan view of a current motor constructed in accordance with the invention; Fig. 2 is a side elevation of the same; Fig. 3 is a front elevation; Fig. 4 is a horizontal sectional view taken immediately above the water wheel; Fig. 5 is a central vertical longitudinal section, parts being omitted to avoid confusion; Fig. 6 is a central vertical cross section taken at right angles to Fig. 5; Fig. 7 is a horizontal sectional view through the motor frame with the wheel and floats removed and showing a plan view of the bottom portion of the frame; Fig. 8 is an enlarged horizontal sectional view of the wheel taken on line 8—8 of Fig. 9; Fig. 9 is a side view of the same; Fig. 10 is a horizontal sectional view showing a modified form of the motor for use in bodies of water having changing tides which are employed to operate the water wheel; Fig. 11 is a plan view of the "breaker" supporting plate showing the "breakers" arranged thereon; Fig. 12 is an enlarged vertical sectional view of the same taken through the "breakers" on the line 12—12 of Fig. 11. Fig. 13 is a detail section on the line 13—13 of Fig. 11.

In the embodiment of the invention, I provide a main supporting frame 1 consisting of a series of upper and lower transversely disposed bars 2 which are connected together at their opposite ends by upper and lower pairs of longitudinally disposed bars 3 and diagonally disposed bars 4, as clearly shown in Fig. 7 of the drawings. The upper and lower transversely and longitudinally disposed bars are supported and spaced apart by vertically disposed upright posts 5 arranged along the line of the longitudinal bars 3, as shown. On the frame formed by the upper longitudinal bars 3 and cross bars 2 is arranged a platform or deck 6. Secured to the inner rows of posts 5 are longitudinally disposed partition plates 7 which separate the frame into a central and two side compartments.

Slidably mounted in vertical centrally disposed guides 8 secured to the partition plates 7, is a transverse horizontally disposed wheel supporting bar 9 in which is revolubly mounted the lower end of a central vertically disposed drive shaft 10, on which is mounted a horizontally disposed water wheel 12.

The wheel 12 consists of upper and lower outside frames 13 which are preferably octagonal in shape. In the center of the wheel is a hollow cylindrical drum 14 through the center of which passes the drive shaft 10 and which has securely bolted to its top and bottom, spiders 14' which are keyed to the drive shaft to revolve the same through the action of the wheel. The upper outside octagonal frame is secured to the drum and supported by radial arms or bars 15 and the lower octagonal frame is secured to the upper frame 13 by vertically disposed bars 16 and diagonal brace bars 17. The vertical bars 16 are secured to the sides of the drum and braced by radial brace bars 18 arranged below the bars 15 as shown.

The wheel is provided with a bottom plate 19 consisting of an inner circular section secured to the bottom of the drum, an outer annular section secured to the lower octagonal frame 13 and an intermediate annular section which is supported by vertical bars 24 secured at their upper ends to the radial bars 15 and 18. Between the intermediate section, and the inner and outer sections of the bottom plate 19 are formed annular passages, the purpose of which will hereinafter appear. The wheel is also provided with a circular top plate arranged on and secured to the radial bars 15 and the upper frame 13.

Pivotally mounted between the frames 13 of the wheel at the octagonal corners of the same, are blade supporting posts 20, to which are secured blades or wings 21. In the frames between the octagonal corners thereof are pivotally mounted blade supporting posts 22 to which are secured blades 23. Between the radial arms or bars 15 and 18 and the intermediate annular section of the bottom plate are pivotally mounted blade supporting posts 24 to which are secured an inner series of blades 25. When in an operative position, the inner edges of the blades 21 engage the pivot posts 24 of the inner series of blades, said posts forming stops which hold the blades 21 in operative position against the pressure of the current. The blades 25 of the inner series engage stop bars 25' bolted to the drum 14 and are thereby held in operative position, while the blades 23 are adapted to engage stop posts or bars 26 which are suitably secured in the frame of the wheel, as shown. The blades or wings are automatically swung to operative or inoperative positions by the action of the current of the water and will open and close gradually and noiselessly as the wheel is revolved.

Secured to the wheel supporting bar 9 is a series of radial supporting bars 27 to which are bolted or otherwise connected a stationary "breaker" supporting plate 28 which is formed of an inner circular section, an outer annular section and an intermediate section. The inner and outer sections are spaced from the intermediate section to form inner and outer annular passages which aline with the passages between the sections of the bottom plate 19.

In the wheel between the radial brace bars 18 and the bottom plate 19 are arranged "breakers" which are preferably in the form of hollow segmental boxes 28$^a$. The "breakers" are disposed in the non-working side of the wheel in the position shown in the drawings and serve to close the non-working side and to direct the water through the working side of the wheel.

When the wheel is used in rivers or streams having currents which operate the wheel, the "breakers" are rigidly bolted to the supporting plate 28 through the annular passages formed in the bottom plate 19 of the wheel. When the wheel is used in bodies of water having changing tides which operate the wheel, the "breakers" must be adjustably connected to the supporting plate 28. The adjustable connection between the "breakers" and the plate 28 is here shown and preferably consists of pairs of channel shaped guide rings 28$^b$ which are engaged with the opposite edges of the annular passages formed between the sections of the plate 28.

The "breakers" are secured to the annular guide rings 28$^b$ and are turned to their adjusted positions on the plate 28 by sliding the guide rings around in the passages of the plate. The "breakers" are secured to the rings 28$^b$ by forming segmental slots in the bottoms of the "breakers" and forming the vertical flanges on the upper portions of the rings at certain points which extend into the slots and bolting said extensions to lugs 28$^c$ arranged in the "breakers" as shown. By this means, the "breakers" may be shifted to close one side or the other of the wheel.

The "breakers" are secured in their adjusted positions on the plates 28 in any suitable manner, but are preferably secured by fastening pins 28$^d$ which are engaged with alined locking holes 28$^e$ formed in the plate 28 and guide rings 28$^b$. The breakers are spaced apart and arranged in the wheel to provide proper clearance space for the passage of the blades and their supporting and stop bars. It will be understood that the blades are swung back to inoperative positions when passing the "breakers."

On one or both ends of the frame 1 are arranged deflecting plates 30, said plates being hingedly connected at their lower ends to forwardly projecting extensions 31 of the lower portion of the motor frame as shown. The upper ends of the deflecting plates 30 are connected to the outer ends of adjusting rods 32, the inner ends of which are connected to pistons 33 arranged in air cylinders 34 secured to the deck or upper portion of the motor frame. By means of the air cylinders 34 and pistons 33 the upper portions of the deflecting plates may be tilted or inclined to direct the current of the water downwardly and into the passage leading to the water wheel, thus increasing the action of the current on the wheel. Pivotally mounted at the center of the end of the machine is a movable deflecting plate 35 which is adapted to be swung across the front end of the motor and into engagement with one or the other of the deflecting plates 30, thus closing one side or the other of the motor and directing the water to the opposite side and into engagement with the working side of the wheel. By thus shifting the current of water, from one side of the frame to the other, the direction of the water wheel may be reversed. The deflecting plate 35 is also preferably hingedly connected at its lower and inner corner to the bottom of the motor frame and is connected at its upper inner corner to the outer end of an operating rod 36, the opposite end of which is connected to a piston arranged in an air cylinder 37, thus providing means for tilting the upper portion of the deflecting plate to correspond with the inclination of the stationary deflecting plates 30.

In addition to the deflecting plates 30 and 35, I provide upper and lower deflecting plates 38 and 39 which are preferably hingedly connected at their outer ends to a forward extension of the frame 1. The plates 38 and 39 incline inwardly toward their inner ends and form a converging passage, the inner end of which corresponds in width to the width of the water wheel. The inner ends of the plates 38 and 39 are curved or raised to correspond with the curvature or circular edge of the top and bottom plates of the water wheel. The inner ends of the plates 38 and 39 are connected together by supporting bars 40, said bars being connected at their upper ends to the lower ends of operating rods 41. The upper ends of the rods 41 are connected to pistons 42 arranged in air cylinders 43 secured to the frame of the motor whereby when air is let into said cylinders, the plates 38 and 39 may be moved to correspond with the height or level of the operating wheel.

The plates 38 and 39 are formed in slidably engaged adjustable sections, one of said sections being provided with slots 44, while the engaging section is provided with rivets 45, thus providing for the lengthening and shortening of the plates as they are moved up or down by the operating rods 41. The plates 38 and 39 together with the deflecting plates 30 and 35 form an inwardly converging spout to direct the current of the water into the passage in which the working side of the wheel operates. The air cylinders which operate the deflecting plates are each provided with manually operated relief valves 46 by means of which the air is released from the cylinders to permit the pressure of the water to move the plates in a reverse direction to that in which they are operated by the piston rods in the cylinders.

Hingedly connected at its upper edge to the upper frame of the motor is a central longitudinally disposed folding partition or dividing plate 47 which is adapted to be swung downwardly alongside the shaft 10 of the water wheel and to divide the space between the top of the wheel and the platform of the motor into two longitudinally disposed passages and thus separate the working side of the motor from the opposite side. The plate 47 is adjusted by means of a segmental operating bar 48 which works through a slot in the platform of the motor and is provided with a series of passages to receive a fastening pin whereby the plate is held in its adjusted position.

In the two outer side compartments formed by the partition plates 7 and between the inner and outer rows of supporting posts 5 are arranged hollow air tight floats 49, to the inner and outer sides of which adjacent to their lower edges are secured brackets 50 to which are connected the lower ends of piston rods 51, the upper ends of which are connected to the pistons which are operatively mounted in cylinders 52, bolted or otherwise rigidly secured to the upper portions of the posts 5. The cylinders 52 are provided with manually operated relief valves 53 by means of which the air is released from any of the cylinders. By means of the air cylinders 52, the piston rods 51 and the motor frame may be raised or lowered and supported to the desired position by means of the air admitted to the upper ends of the cylinders in the manner hereinafter described. Arranged in the upper portion of the guideways 8 on the partition plates 7 are compressed air cylinders 52' in which are arranged pistons and piston rods 53', the lower ends of which are connected to the wheel supporting bar 9 whereby when compressed air is admitted to said cylinders the wheel may be forced downwardly to the desired position in the frame, the hollow air tight drum 15 of the wheel acting as a float to raise the wheel when the compressed air is released from the cylinders.

On the upper end of the guide shaft 10 is keyed a bevel gear wheel 53 with which is operatively engaged a similar gear 54 mounted on the end of a power transmitting shaft 55 which is mounted in suitable bearings on the platform 6 of the motor. On the opposite end of the shaft 55 is mounted a spur gear wheel 56 which is connected by a train of multiplying gears 57 with a drive pulley 58 which is connected by a belt 59 to a pulley 60 on a suitably mounted shaft 61 on which is also mounted a loose pulley 62 to which the belt 59 may be shifted. The pulley 60 is operatively connected to the piston rod 63 of an air pump 64 mounted on the deck or platform 6, as shown. By means of the operating mechanism thus described, the movement of the water wheel will be transferred to the air pump to operate the same. On the deck or platform near the opposite or rear edge of the same is arranged a second pump 65 which is provided with an operating pulley 66 with which the belt 59 may be engaged. By providing two pumps and arranging the same as herein shown, the operating mechanism may be connected with one or the other, thus permitting either pump to be stopped for repairs or other purposes.

Connected to the air pumps 64 and 65 are lines of air conducting pipes 67 which extend across the frame and are connected at their opposite ends to flexible air conducting tubes 68 which extend downwardly and are connected to valved nipples 69 arranged in the floats 49 whereby the air may be pumped into the floats and compressed therein by means of the pumping mechanism hereinbefore described. The pipe lines 67 are provided at their outer ends with check valves 70 which permit the air to be forced into the hollow floats but prevent the return of the air to the pipe lines.

The floats 49 are provided with safety valves 71 to prevent the bursting of the floats from an over pressure of air forced therein by the pumping mechanism. On the deck or platform over each of the floats 49 is arranged an air dome or chamber 72 which are connected to the floats 49 by flexible air tubes 75, the lower ends of which are engaged with valved nipples 76 arranged in the floats. With the air domes 72 are connected a series of diverging conducting pipes 77 in which are arranged cut-off valves 78. The pipes 77 have connected thereto branch pipes 79 in which are arranged valves 80. The pipes 77 and 79 are connected at their outer ends to the air cylinders 52 whereby the frame of the motor is raised or lowered. By providing the air domes 72, air may be admitted simultaneously to all of the cylinders 52 so that the frame may be evenly raised or elevated. In addition to the air supply pipes 77 and 79, the air cylinders 52 also have connected thereto individual flexible air supply pipes 81, the lower ends of which are connected to valved nipples 82 in the floats 49 thereby permitting the air from the floats to be conveyed directly to each of the cylinders so that by cutting off the supply pipes from the dome 72, to any one or all of the cylinders, said cylinders may be operated directly from the floats, as will be understood. The cylinders 34 are supplied with air from the floats to operate the deflecting plates by means of flexible air conducting tubes 83 which are connected to the floats by valved nipples 84. One of the flexible air conducting tubes 81 is also provided to conduct the compressed air from the floats to the wheel adjusting cylinders 52' whereby the wheel supporting bar may be adjusted, as hereinbefore described.

Arranged on the deck or platform 6 of the motor are compressed air engines or motors 85 which are supplied with air through pipe lines 86 running from the floats as shown. The pipe lines 86 are connected to the floats by flexible air conducting tubes 87, the lower ends of which are connected to valved nipples 88 arranged in the floats, as shown. The pipe lines from the floats are provided with cut-off valves 89 whereby the flow of air to the engines is controlled. On the drive shaft 91 of the engines is mounted drive pulleys 91' which are connected by belts 92 to dynamos 93 which are arranged on the deck of the motor, the operating shafts of the dynamos being provided with fast and loose pulleys 94 and 95 so that the dynamos may be readily thrown into and out of operative connection with the drive pulleys of the air engines.

Secured to the forward ends of the partition plates 7 are anchor rings 96 to which may be connected one end of anchoring cables, not shown, by means of which the motor is held in operative position in the stream or body of water. The cables after being engaged with suitable anchoring devices, are preferably passed beneath the motor and brought up into engagement with windlasses or winding drums 97 arranged on the deck of the motor adjacent to its rear edge.

The hollow floats 49 are provided with water inlet valves 98 which are adapted to be opened and closed through suitable manholes arranged in the top of the floats, said man-holes being inclosed by suitable air and water tight covers 99.

In Fig. 10 of the drawings is shown a modified arrangement of the motor, the same being shown in this figure as constructed in double form or provided with deflecting plates on each end whereby the water wheel may be operated in either direction. The form of the motor shown in Fig. 10 is adapted for use in bodies of water having changeable tides which are employed for operating the water wheel, the outgoing tide being employed to operate the wheel from one end of the motor, while the incoming tide operates the same from the opposite end of the motor. By arranging the air pumps, the air engines and dynamos on the deck all the power generating devices will be carried by the motor and the electricity generated by the dynamos will be conducted to the shore by suitable or electric conducting cables to provide electricity for power or lighting purposes.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In a current motor, a frame, a water wheel revolubly mounted in said frame, hollow floats arranged in the motor frame, and air pumps operated by the water wheel to compress air into said floats.

2. In a current motor, a frame, a water wheel revolubly mounted in said frame, hollow floats arranged in the frame, compressed air frame raising devices connected to said floats, means operated by the water wheel to compress air into said floats, and means whereby the compressed air in the floats is applied to said raising devices to operate the same.

3. In a current motor, a frame, a water wheel revolubly mounted in said frame, hollow floats arranged in the frame of the motor, air pumps operated by said water wheel to compress air into said floats, a series of compressed air frame raising devices connected to said frame and to said floats, air distributing domes, a compressed air conducting pipe to connect said domes with said floats whereby the compressed air in the latter is conducted to the domes, and valved air distributing pipes to connect said domes with said compressed air frame raising devices whereby the motor frame may be raised or lowered on the floats.

4. In a current motor, a frame, a water wheel revolubly mounted in said frame, hollow floats arranged in the frame of the motor, air pumps operated by said water wheel to compress air into said floats, a series of compressed air frame raising devices connected to said frame and to said floats, air distributing domes, a compressed air conducting pipe to connect said domes with said floats whereby the compressed air in the latter is conducted to the domes, valved air conducting pipes to connect said domes with said frame raising devices whereby they are simultaneously operated, air conducting tubes to directly connect the floats with said frame raising devices whereby they may be individually operated, and safety valves arranged in said floats.

5. In a current motor, a frame, a water wheel, a series of water deflecting plates arranged on said frame to direct the current of water on to the working side of the wheel, compressed air operating devices connected with said deflecting plates, hollow floats arranged in said frame, means operated by said wheel to compress air into said floats, means whereby the compressed air from the floats is conducted to said compressed air operating devices to adjust said deflecting plates.

6. In a current motor, a frame, a water wheel revolubly mounted in said frame, hollow floats aranged in the frame, air pumps operated by said water wheel to compress air into said floats, compress air engines arranged on said motor frame, means to conduct the compressed air from said floats to air engines, and dynamos arranged on the motor frame and adapted to be operated by said air engines.

7. In a current motor, a frame, a water wheel revolubly mounted in said frame, compressed air adjusting devices whereby the water wheel is vertically adjusted in the motor frame, hollow air tight floats arranged in the frame, means operated by the water wheel to compress air into the floats, means whereby the compressed air from the floats is conducted to said wheel adjusting devices, and compressed air operating devices connected to said frame and floats and operated by the compressed air from the floats to raise the frame.

8. In a current motor, a frame, a wheel supporting bar adjustably mounted in said frame, a revolubly mounted drive shaft, a water wheel revolubly mounted on said supporting bar and operatively connected to said shaft, compressed air adjusting devices connected to said wheel supporting bar whereby the latter is adjusted to hold the wheel at the desired position in the frame, hollow air tight floats arranged in each side of the motor frame, air compressing pumps arranged on the motor frame and connected to said floats, means whereby said pumps are operated by the drive shaft of the water wheel, compressed air cylinders secured to said frame, pistons and piston rods arranged in said compressed air cylinders, means to connect said piston rods to the floats, means to operatively connect said cylinders with the floats whereby compressed air is conducted from the floats to the cylinders to operate the pistons and piston rods therein thereby raising said motor frame on the floats, means to conduct compressed air from the floats to the adjusting mechanism of the wheel supporting bar, adjustable water deflecting plates adapted to direct the current of water on the working side of the wheel and compressed air adjusting mechanism connected to said plates and adapted to be operated by the compressed air from the floats.

9. In a current motor, a frame, longitudinally disposed partition plates arranged in said frame to form an inner wheel compartment and outer side float compartments, a water wheel revolubly mounted in said wheel compartment, said wheel comprising a centrally disposed hollow air tight drum, upper and lower frames, radially disposed arms or bars to secure said frames to the drum, a series of wings or blades pivotally mounted between said frames, top and bottom cover plates arranged on the frames of the wheel, adjustable breakers arranged between said top and bottom plates in said frame, means to adjust the wheel vertically, a series of deflecting and current directing plates arranged on the frame to direct the current of the water on to the working side of the wheel, means to adjust said deflecting plates, hollow floats arranged in the side compartments of the frame, and means to adjustably connect the frame to the floats.

10. In a current motor, a frame, a deck or platform arranged on said frame, longitudinally disposed partition plates arranged in the frame to divide the same into a central wheel compartment and into outer side compartments, a longitudinally disposed current directing plate hingedly connected to the upper side of the frame and adapted to be swung downwardly to divide the upper portion of the central compartment, a water wheel revolubly mounted in the lower portion of the compartment, diverging deflecting plates arranged on the end of the motor, a pivotally mounted deflecting plate adapted to be swung into engagement with one or the other of said diverging deflecting plates whereby the current of water is directed into one side or the other of the compartment, upper and lower hingedly mounted inwardly converging current deflecting plates adapted to direct the current of water against the working side of the wheel, compressed air operating devices connected to said deflecting plates, hollow air tight floats arranged in the outer side compartments of the frame, means operated by the water wheel to compress air into said floats, and means whereby said compressed air is conducted to said compressed air plate operating devices whereby the deflecting plates are adjusted.

In testimony whereof I have hereunto set my hand in presence of two subscribing witnesses.

JAMES W. MYERS.

Witnesses:
GEORGE N. PARKER,
FRANK FERTIG.